(12) United States Patent
Irwin et al.

(10) Patent No.: US 12,359,461 B2
(45) Date of Patent: Jul. 15, 2025

(54) KEY CAPTURE LOCK

(71) Applicant: United States Postal Service, Washington, DC (US)

(72) Inventors: Donald Eugene Irwin, Fredericksburg, VA (US); William Albert Tartal, Baltimore, MD (US)

(73) Assignee: United States Postal Service, Washington, DC (US)

( * ) Notice: Subject to any disclaimer, the term of this patent is extended or adjusted under 35 U.S.C. 154(b) by 133 days.

(21) Appl. No.: 16/844,605

(22) Filed: Apr. 9, 2020

(65) Prior Publication Data

US 2020/0325709 A1     Oct. 15, 2020

Related U.S. Application Data

(60) Provisional application No. 62/832,787, filed on Apr. 11, 2019.

(51) Int. Cl.
*E05B 11/00* (2006.01)
*A47G 29/22* (2006.01)
(Continued)

(52) U.S. Cl.
CPC ............. *E05B 11/00* (2013.01); *A47G 29/22* (2013.01); *E05B 35/086* (2013.01); *E05B 35/12* (2013.01); *E05B 59/00* (2013.01)

(58) Field of Classification Search
CPC ......... A47G 29/22; E05B 85/26; E05B 35/00; E05B 35/08; E05B 35/086; E05B 35/12; E05B 59/00; E05B 11/00; E05B 47/026; E05B 65/025; E05B 35/10; E05B 35/105; E05B 35/14; E05B 63/0073;
(Continued)

(56) References Cited

U.S. PATENT DOCUMENTS 853,485 A    5/1907   Townsend
860,940 A    7/1907   Roche
(Continued)

FOREIGN PATENT DOCUMENTS

JP    H0434189 A   *   2/1992  ............ E05B 35/12
JP    H06193316 A   *   7/1994  ............ E05B 35/12
(Continued)

OTHER PUBLICATIONS

Machine translation of JP-H0434189-A (Year: 1992).*
(Continued)

*Primary Examiner* — Kristina R Fulton
*Assistant Examiner* — Peter H Watson
(74) *Attorney, Agent, or Firm* — Knobbe Martens Olson & Bear LLP (57) ABSTRACT

A lock assembly includes a bolt movable between a first position and a second position, a rotating body rotatable between a first position and a second position, and a pawl member rotatable between a first position and a second position. Rotation of the rotating body from the first position to the second position is configured to cause the bolt to move from the first position to the second position. The pawl member is configured to prevent rotation of the rotating body from the first position to the second position when the pawl member is in the first position and the rotating body is in the first position.

16 Claims, 10 Drawing Sheets

(51) Int. Cl.
*E05B 35/08* (2006.01)
*E05B 35/12* (2006.01)
*E05B 59/00* (2006.01)

(58) Field of Classification Search
CPC .......... Y10T 292/096; Y10T 292/1014; Y10T 292/1016; Y10S 70/41
USPC .................................................... 70/DIG. 41
See application file for complete search history.

(56) References Cited

U.S. PATENT DOCUMENTS

| | | | | |
|---|---|---|---|---|
| 1,032,962 | A * | 7/1912 | Taylor | E05B 35/12 70/339 |
| 1,462,805 | A * | 7/1923 | Gibson | E05B 65/08 292/140 |
| 1,640,605 | A * | 8/1927 | Johnson | G07F 17/14 194/290 |
| 3,077,359 | A * | 2/1963 | Ettore | E05B 59/00 292/3 |
| 3,249,197 | A * | 5/1966 | Smith | G07F 17/14 194/236 |
| 3,599,770 | A * | 8/1971 | Stackhouse | G07F 17/12 194/290 |
| 3,773,158 | A * | 11/1973 | Wada | G07F 17/12 194/281 |
| 3,790,244 | A | 2/1974 | Stackhouse | |
| 4,384,641 | A * | 5/1983 | Stackhouse | G07F 17/12 70/85 |
| 4,448,051 | A | 5/1984 | Neilsen | |
| 4,567,741 | A | 2/1986 | Trempala | |
| 5,372,021 | A | 12/1994 | Smith | |
| 5,791,180 | A * | 8/1998 | Ha | E05B 35/12 70/120 |
| 6,513,357 | B2 * | 2/2003 | McCurry | E05B 11/00 70/389 |
| 2009/0241619 | A1 * | 10/2009 | Kuester | E05B 11/00 70/389 |

FOREIGN PATENT DOCUMENTS

| | | | | |
|---|---|---|---|---|
| JP | H07259401 A | * | 10/1995 | ............ E05B 35/00 |
| KR | 19990040534 A | * | 6/1999 | |
| WO | WO 2006/004712 A2 | | 1/2006 | |
| WO | WO 2007/073800 A1 | | 7/2007 | |
| WO | WO 2007/089749 A2 | | 8/2007 | |

OTHER PUBLICATIONS

Machine translation of KR 19990040534 A (Year: 1999).*
Machine translation of JP-H07259401-A (Year: 1995).*
International Search Report and Written Opinion mailed Jul. 13, 2020 in International Application No. PCT/US2020/027414 filed Apr. 9, 2020.
International Preliminary Report on Patentability dated Sep. 28, 2021, in International Application No. PCT/US2020/027414 filed Apr. 9, 2020.

* cited by examiner

KEY CAPTURE LOCK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 62/832,787, filed Apr. 11, 2019, the entire contents of which are hereby incorporated by reference.

BACKGROUND

Field

This invention relates to lock assemblies.

Description of the Related Technology

Locks are frequently used to secure a door or lid of a storage receptacle such as a mailbox or a parcel locker. A single storage receptacle may be shared between multiple users to receive distribution items such as parcels, packages, letters, flats, and the like. When a user of a shared storage receptacle receives a distribution item in the storage receptacle, a locking system or procedure may be initiated by a delivery person or other individual controlling access to the storage receptacle to restrict access to the storage receptacle to only the intended recipient of the distribution item. After the distribution item is deposited in the storage receptacle, a key to the storage receptacle can be provided by the delivery person or other individual controlling access to the storage receptacle to the intended recipient of the distribution item. When the intended recipient opens the storage receptacle using the key, the locking system can maintain the key in the locking system and maintain the storage receptacle in an unlocked configuration until the key can be retrieved by the delivery person or other individual controlling access to the storage receptacle, for example, when another delivery is delivered to the storage receptacle. Such a locking system can unintended individuals for accessing the storage receptacle when a distribution item is positioned therein. Such a locking system can also prevent mishandling or misuse of the key by a recipient after their removal of a distribution item from the storage receptacle.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

SUMMARY

Aspects of the present invention include systems, devices, and methods for locking a lockable volume.

One aspect is a lock assembly. The lock assembly includes a bolt movable between a first position and a second position, a rotating body rotatable between a first position and a second position and having an arm coupled to the bolt, wherein rotation of the rotating body from the first position to the second position is configured to cause the bolt to move from the first position to the second position, and a pawl member rotatable between a first position and a second position, wherein the pawl member is configured to prevent rotation of the rotating body from the first position to the second position when the pawl member is in the first position and the rotating body is in the first position.

In some embodiments, the pawl member is configured to permit rotation of the rotating body from the first position to the second position when the pawl member is in the second position. In some embodiments, the rotating body includes a plurality of teeth, and the pawl member includes a pawl configured to engage the plurality of teeth when the pawl member is in the first position and the rotating body is in the first position to form a ratcheting mechanism. In some embodiments, the lock assembly further includes a spring configured to bias the pawl member to the first position. In some embodiments, the rotating body includes a first rotating body, and the lock assembly includes a second rotating body rotatable between a first position and a second position, wherein the second rotating body is configured to engage the pawl member when the second rotating body is rotated between the first position to the second position to cause the pawl member to rotate from the first position of the pawl member to the second position of the pawl member. In some embodiments, the second rotating body includes a protrusion configured to engage the pawl member when the second rotating body is rotated from the first position to the second position to cause the pawl member to rotate from the first position to the second position.

Another aspect is a method for operating a lock assembly. The method includes rotating a pawl member from a first position to a second position, wherein the pawl member is configured to prevent rotation of a rotating body from a first position to a second position when the pawl member is in the first position and the rotating body is in the first position, and rotating the rotating body between the first position and the second position, wherein the rotating body comprises an arm coupled to a bolt, wherein rotation of the rotating body from the first position to the second position is configured to cause the bolt to move from a first position to a second position.

In some embodiments, the pawl member is configured to permit rotation of the rotating body from the first position to the second position when the pawl member is in the second position. In some embodiments, the rotating body includes a plurality of teeth, and the pawl member includes a pawl configured to engage the plurality of teeth when the pawl member is in the first position and the rotating body is in the first position to form a ratcheting mechanism. In some embodiments, the lock assembly includes a spring configured to bias the pawl member to the first position. In some embodiments, the rotating body is a first rotating body, and the method further includes rotating a second rotating body from a first position to a second position, wherein the second rotating body is configured to engage the pawl member when the second rotating body is rotated from the first position to the second position to cause the pawl member to rotate from the first position of the pawl member to the second position of the pawl member. In some embodiments, the second rotating body includes a protrusion configured to engage the pawl member when the second rotating body is rotated from the first position to the second position to cause the pawl member to rotate from the first position to the second position. In some embodiments, the method further includes receiving a first key in a first lock, the first lock coupled to the rotating body, and receiving a second key in a second lock, the second lock coupled to the pawl member. In some embodiments, the method further includes turning the first key within the first lock to cause rotation of the rotating body and turning the second key within the second lock to cause rotation of the pawl member.

DETAILED DESCRIPTION

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The following detailed description is directed to certain specific embodiments of the development. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Furthermore, embodiments of the development may include several novel features, no single one of which is solely responsible for its desirable attributes or which is essential to practicing the invention described herein.

Distribution items are increasingly being delivered to manned or unmanned areas having storage receptacles with lockable volumes for receiving the items, such as parcel locker installations. These storage receptacles are secured with locks. It can be advantageous to have a single storage receptacle that can receive distribution items for multiple recipients. It can also be advantageous to have a lock assembly on a storage receptacle that can be operated to allow access to only a recipient who has received a distribution item in the storage receptacle while preventing access to other users of the storage receptacle.

Some embodiments disclosed herein relate generally to a lock assembly. The lock assembly can include a door lock that can be locked to secure a door of a storage receptacle so that a lockable volume within the storage receptacle is inaccessible. The door lock can include a lock mechanism, such as a bolt, that can interact with a securement feature of the storage receptacle to prevent opening of the door when the door lock is locked. The door lock can also be unlocked to allow the door of the storage receptacle to be opened to allow access to the lockable volume within the storage receptacle. For example, the lock mechanism can be disengaged from the securement feature of the storage receptacle to allow the door to open. The door lock can be locked and unlocked via a door lock interface, such as, for example, a keyhole or keyway. A user can manipulate the door lock interface using a door lock key. For example, the door lock key may be rotated in a first direction to cause the door lock to lock. The door lock key may be rotated in a second direction to cause the door lock to unlock. In certain embodiments, the first direction of rotation of the door lock key may be opposite from or different than the second direction.

The lock assembly can further include a restriction mechanism configured to prevent locking of the door lock in certain configurations. For example, the restriction mechanism can be configured to prevent locking of the door lock after the door has been unlocked. The restriction mechanism can also prevent removal of the door lock key in certain configurations. The restriction mechanism can also be manipulated to release the door lock to allow locking of the door lock and removal of the door lock key from the door lock interface.

In certain embodiments, the restriction mechanism can be a ratchet and pawl. For example, the door lock may include or be coupled to a plurality of ratchet teeth. A pawl may be selectively engaged with the ratchet teeth to prevent rotation of the door lock key in one direction, for example the first direction of the rotation for locking the door lock. The pawl may be selectively disengaged with the ratchet teeth to allow rotation of the door lock in the first direction to allow for locking of the door lock.

In certain embodiments, the restriction mechanism can be manipulated by a user operating a restriction mechanism interface, such as, for example, a keyhole or keyway. The restriction mechanism interface can be operated using a restriction mechanism key. In certain embodiments, the restriction mechanism can be second lock. The restriction mechanism key may be rotated within the keyhole or keyway to cause the restriction mechanism to transition between a first configuration in which the restriction mechanism is configured to prevent locking of the door lock and removal of the door lock key after the door lock is unlocked and a second configuration in which the restriction mechanism is configured to permit locking of the door lock and removal of the door lock key.

The lock assembly described herein can be advantageously employed in a storage receptacle receiving deliveries for multiple recipients. A distribution item for an intended recipient can be deposited in the lockable volume of the storage receptacle by a delivery person or other individual controlling access to the storage receptacle. The delivery person can lock the door lock, remove the door lock key, and provide the door lock key to the intended recipient, for example, by placing the door lock key in a second storage container that is specific to the intended recipient. The intended recipient can open the door lock using the door lock key. After the intended recipient opens the door lock using the door lock key, the restriction mechanism can prevent locking of the door lock and removal of the door lock key. During a subsequent distribution item delivery, the delivery person can use the restriction mechanism key to release the restriction mechanism. When the restriction mechanism is released, the delivery person can lock the door lock and remove the door lock key. The delivery person can then provide the door lock key to the intended recipient of the subsequent distribution item.

Figure 1:
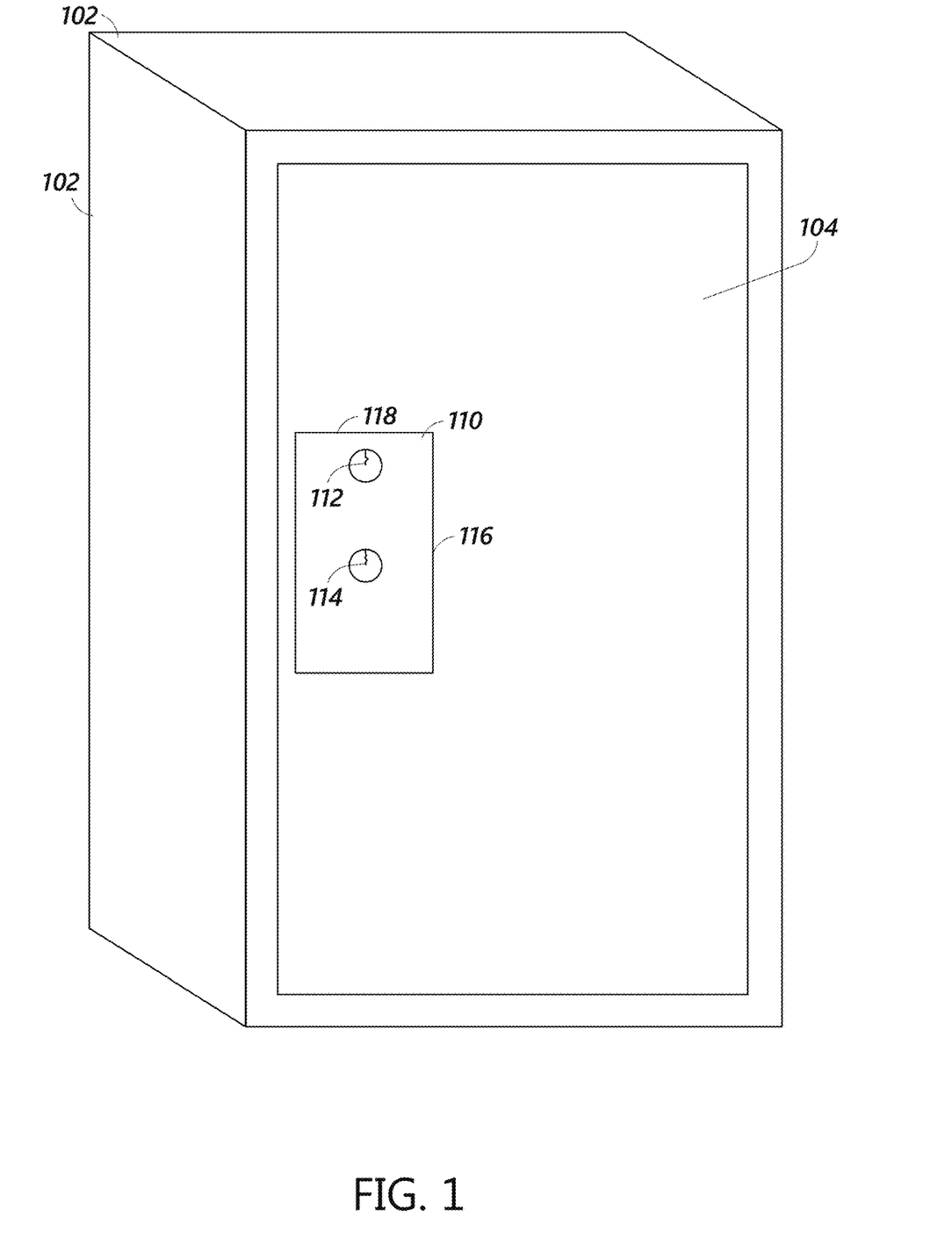
FIG. 1 is a perspective view of one embodiment of a storage receptacle.

FIG. 1 depicts one embodiment of a storage receptacle 100. The storage receptacle 100 includes a plurality of sides 102 and a door 104. The combination of the sides 102 and the door 104 define a lockable volume within the storage receptacle. The door 104 includes a lock assembly 110. The lock assembly 110 includes a lock 112 and a lock 114. As described in further detail with respect to FIGS. 2A-6B, the lock 114 can function as a door lock interface to allow for manipulation of a door lock by a user such as delivery person or an intended recipient of a delivery. A door lock key can be operated with lock 114 to lock and unlock the door lock. The lock assembly 110 can a plurality of faces defining a perimeter of the lock assembly. The plurality of faces can include one or more first faces 116 extending in a first direction and one or more second faces 118 extending from the one or more first faces 116 in a second direction orthogonal to the one or more first faces 116.

In certain embodiments, the lock 112 can function as a restriction mechanism interface to allow for manipulation of a restriction mechanism by a user such as a delivery person. A restriction mechanism key can be operated with the lock 112 to cause a restriction mechanism to restrict the door lock from locking and the key being removed from the lock 114. The restriction mechanism key can also be operated to cause the restriction mechanism to permit the door lock to lock and the key to be removed from the lock 114.

Although a specific example of a storage receptacle 100 is shown, one of skill in the art would understand that the components and features described herein can be used with a variety of storage receptacles. The aspects described herein can be used to control access to a variety of storage receptacles, including for example but not limited to, boxes, drawers, safes, containers, cabinets, and the like. A storage receptacle for use with aspects of the present embodiments can include a swinging door, a sliding door, a lid, a drawer, or a combination to control access to a lockable volume.

Figure 2A:
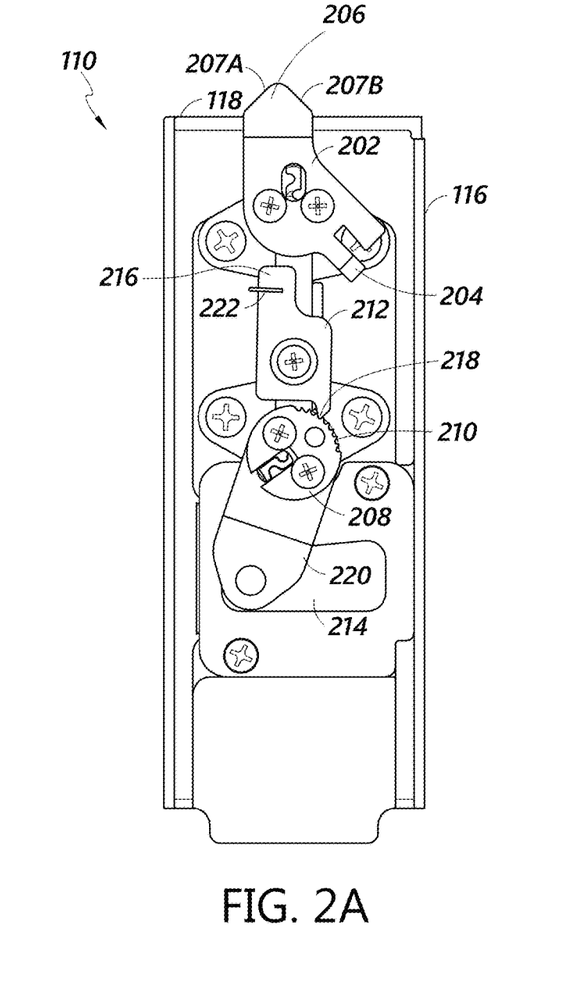
FIG. 2A is a rear view of one embodiment of a lock assembly having a first lock and a second lock in a first configuration.
Figure 4A:
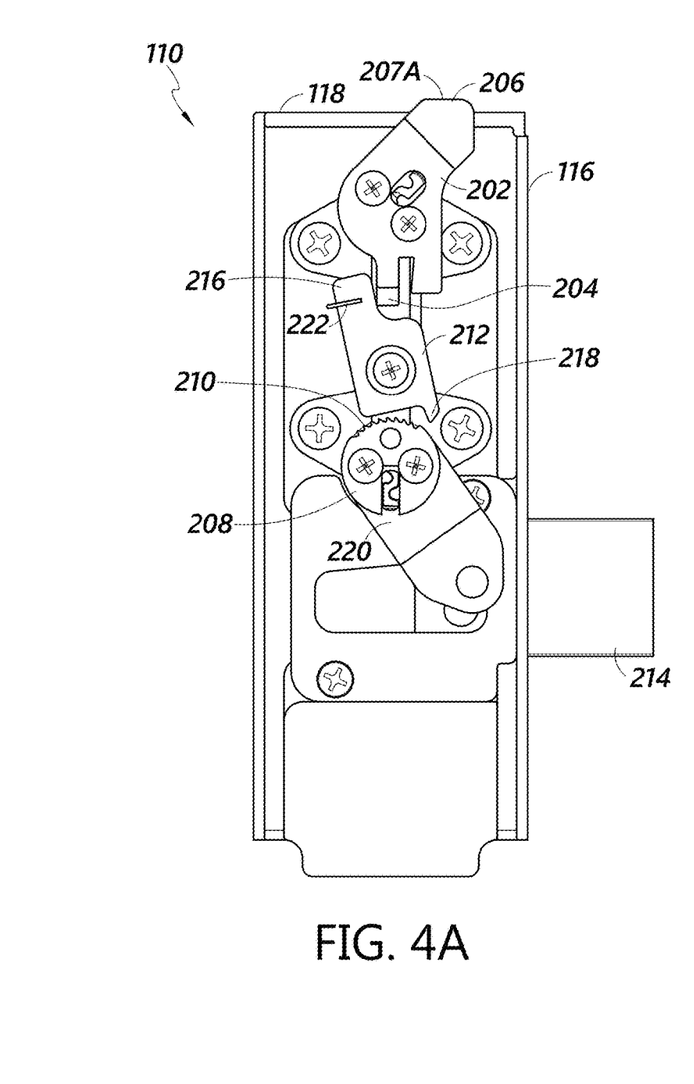
FIG. 4A is a rear view of the lock assembly of FIG. 2A depicting the lock assembly in a third configuration.
Figure 4B:
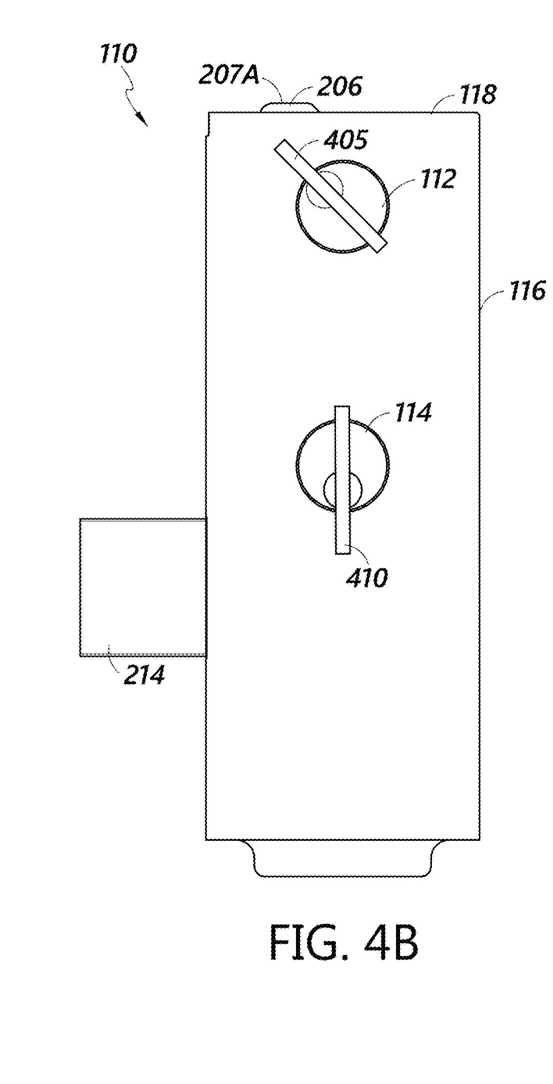
FIG. 4B is a front view of the lock assembly of FIG. 2A in the same configuration as FIG. 4A depicting a key in the first lock and a key in the second lock.
Figure 4C:
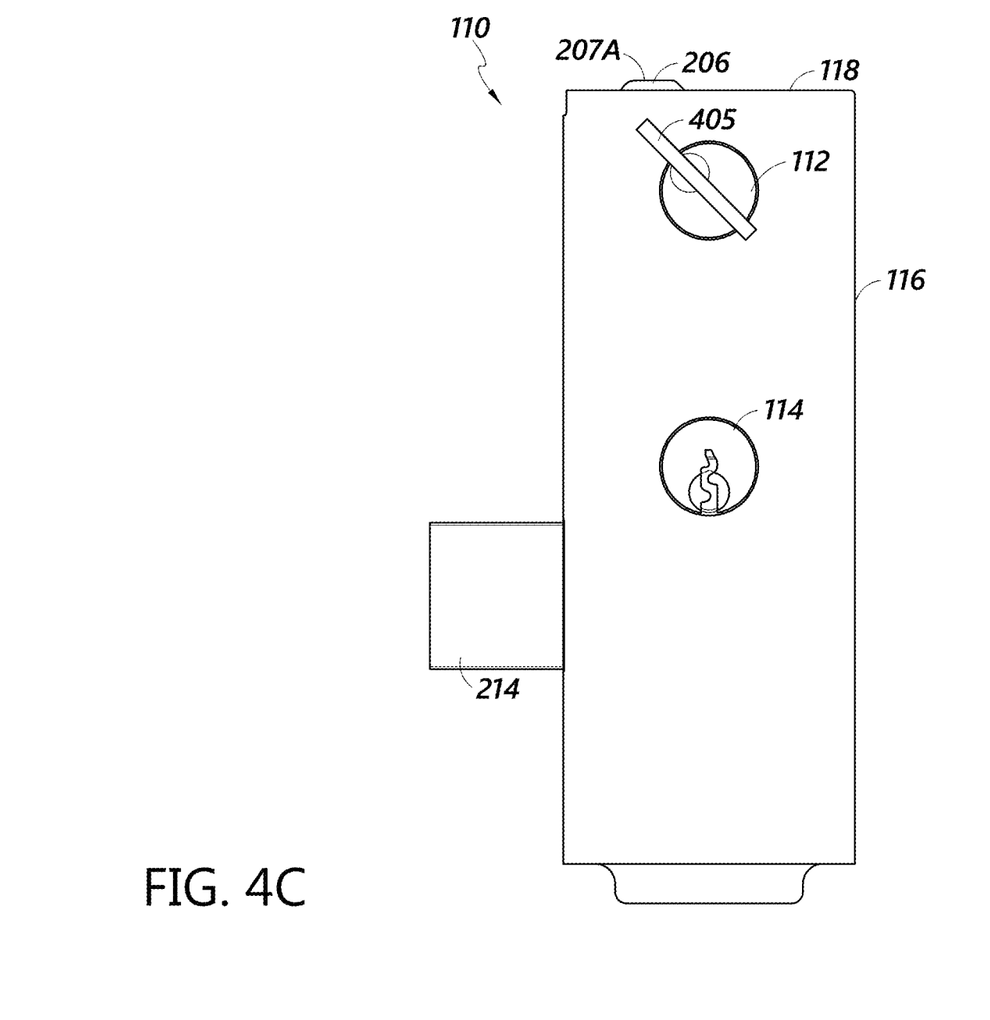
FIG. 4C is a front view of the lock assembly of FIG. 2A in the same configuration as FIG. 4A depicting a key in the first lock.
Figure 5A:
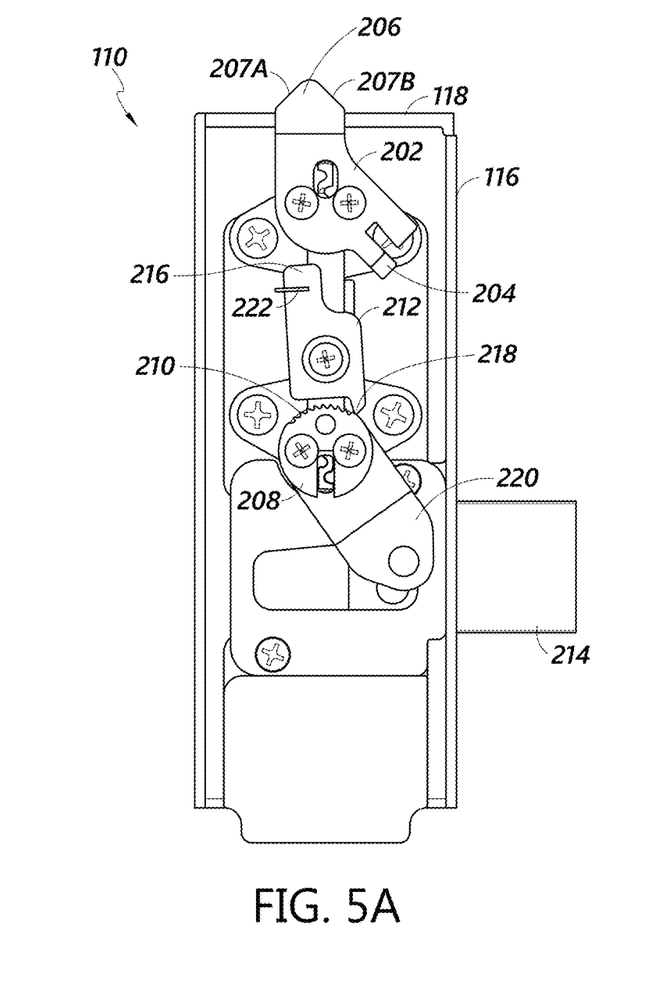
FIG. 5A is a rear view of the lock assembly of FIG. 2A depicting the lock assembly in a fourth configuration.
Figure 5B:
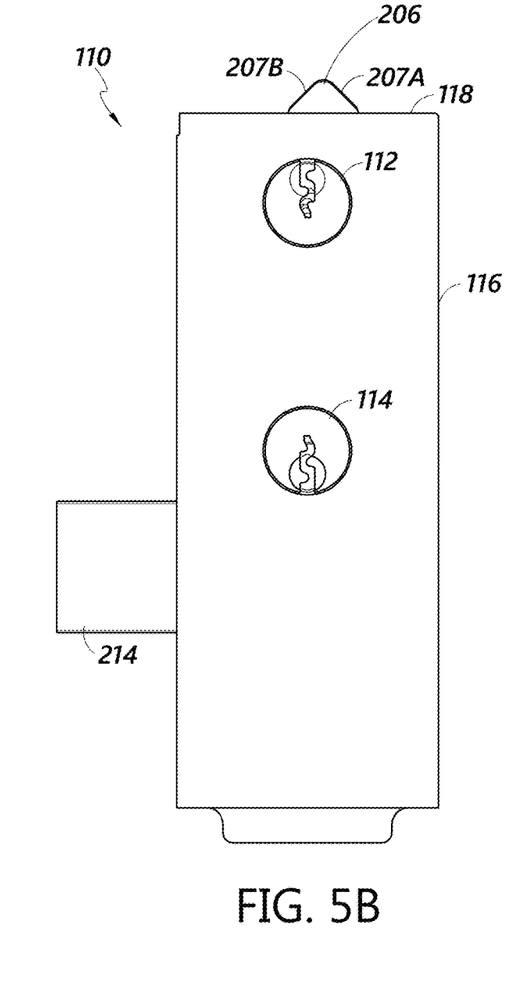
FIG. 5B is a front view of the lock assembly of FIG. 2A in the same configuration as FIG. 5A.
Figure 5C:
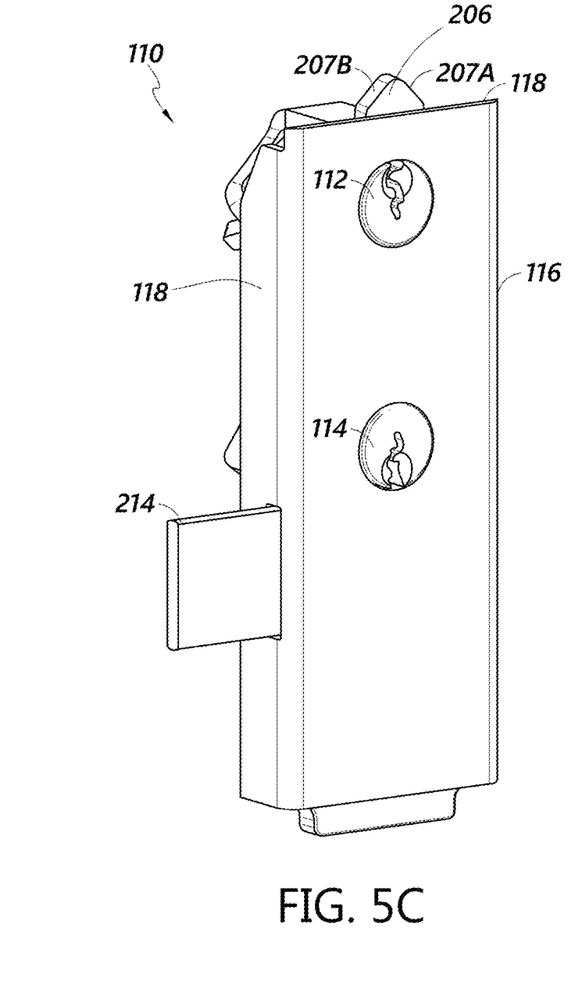
FIG. 5C is a front perspective view of the lock assembly of FIG. 2A in the same configuration as FIG. 5A.
Figure 5D:
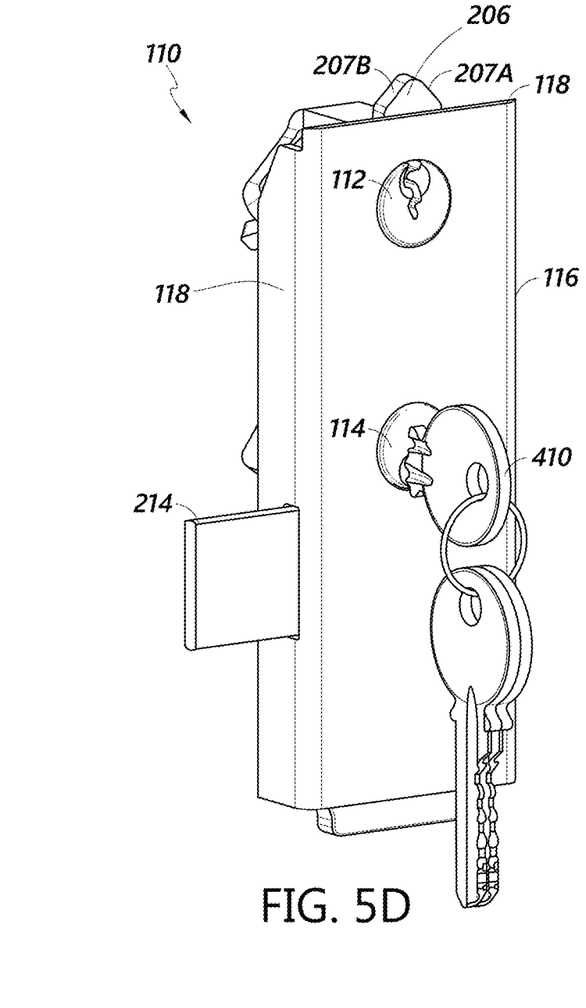
FIG. 5D is a front perspective view of the lock assembly of FIG. 2A in the same configuration as FIG. 5A depicting a key in the second lock.
Figure 5E:
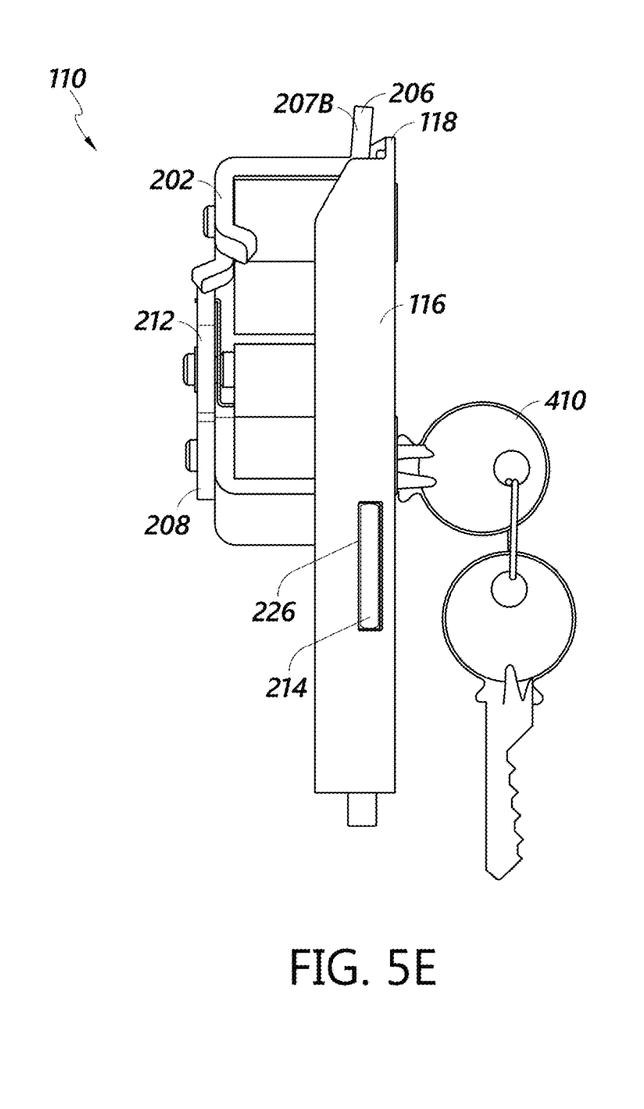
FIG. 5E is a side view of the lock assembly of FIG. 2A in the same configuration as FIG. 5A depicting a key in the second lock.
Figure 5F:
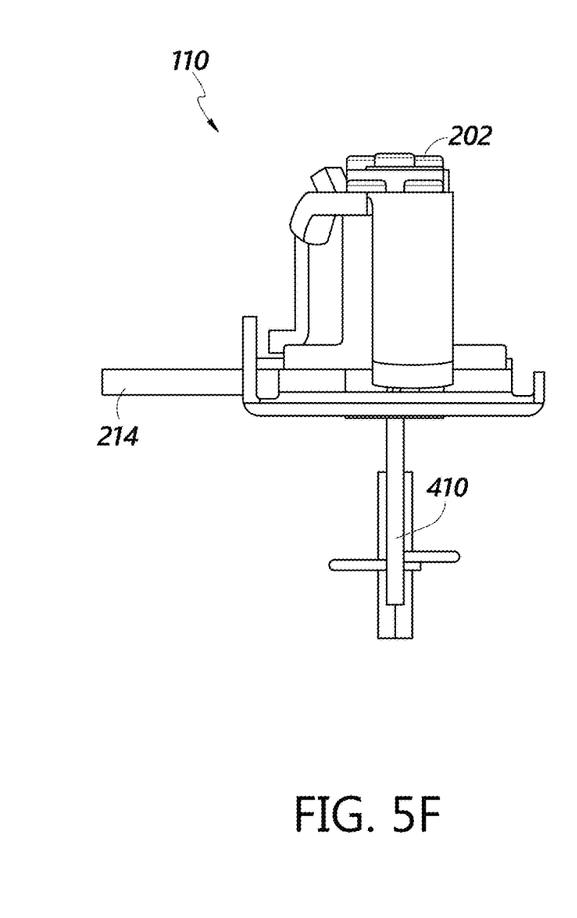
FIG. 5F is a top view of the lock assembly of FIG. 2A in the same configuration as FIG. 5A depicting a key in the second lock.
Figure 6A:
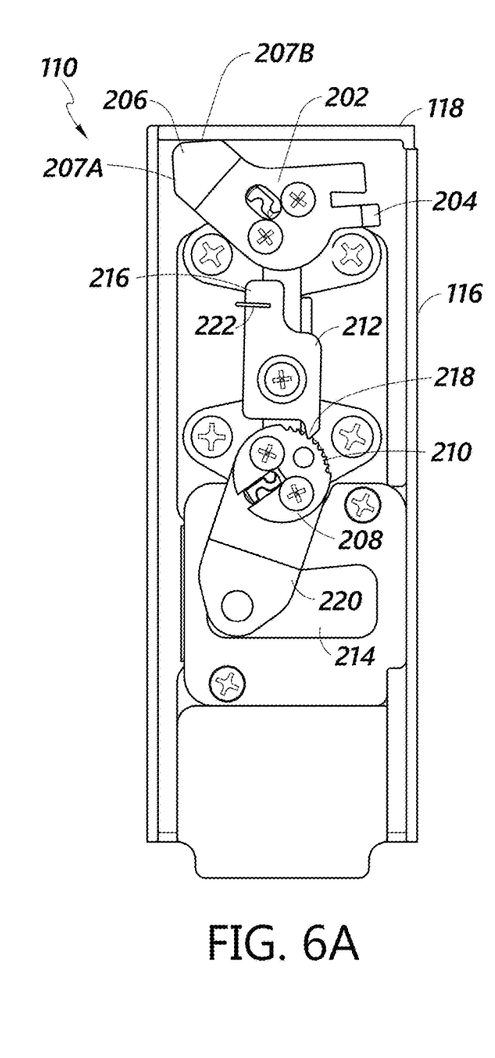
FIG. 6A is a rear view of the lock assembly of FIG. 2A depicting the lock assembly in a fifth configuration.
Figure 6B:
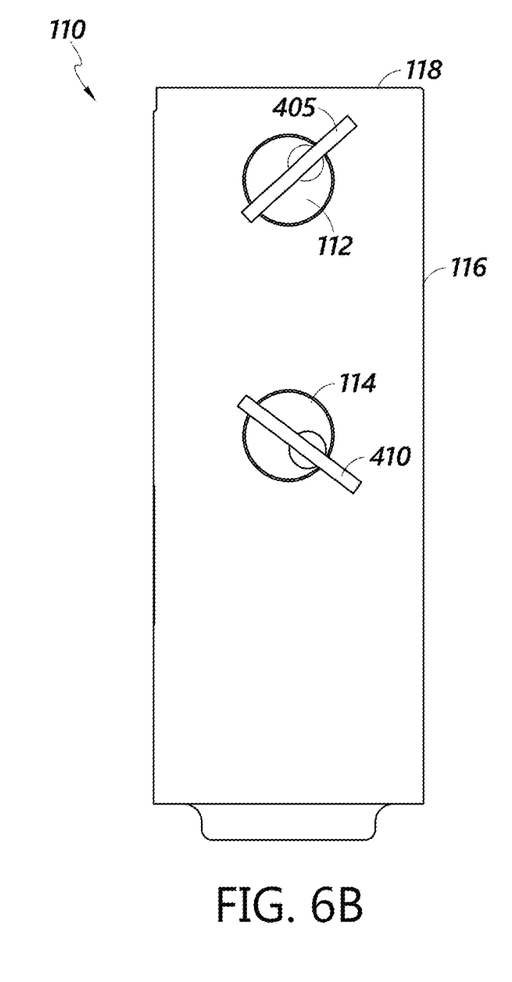
FIG. 6B is a front view of the lock assembly of FIG. 2A in the same configuration as FIG. 6A depicting a key in the first lock and a key in the second lock.

FIG. 2A-6B depict views of the lock assembly 110 in several configurations. FIGS. 2A and 2B depict a rear view and a front view, respectively, of the lock assembly 110 in a first configuration. FIG. 2B depicts a key 410 in the lock 114. FIGS. 3A and 3B depict a rear view and a front view, respectively, of the lock assembly 110 in a second configuration. FIG. 3B depicts a key 405 in the lock 112 and a key 410 in the lock 114. FIGS. 4A, 4B, and 4C depict a rear view, a first front view, and a second front view, respectively of the lock assembly 110 in a third configuration. FIG. 4B depicts the key 405 in the lock 112 and the key 410 in the lock 114. FIG. 4C depicts the key 405 in the lock 112 with the key 410 removed from the lock 112. FIGS. 5A, 5B, 5C, 5D, 5E, and 5F depict a rear view, a front view, a first front perspective view, a second front perspective view, a side view, and a top view, respectively, of the lock assembly 110 in a fourth configuration. FIGS. 5B and 5C show no keys in the locks 112 and 114. FIGS. 5D, 5E, and 5F depict the key 410 in the lock 114. FIGS. 6A and 6B depict a rear view and a front view, respectively, of the lock assembly 110. FIG. 6B depicts the key 405 in the lock 112 and the key 410 in the lock 114.

As shown in FIGS. 2A-6B, the lock assembly 110 includes a cam or body 202, a rotating body 208, a pawl body, pawl cam, or pawl member 212, and a bolt 214. The bolt 214 can be configured to translate between a first position, shown in FIGS. 2A and 3A, to a second position, shown in FIGS. 4A and 5A. As shown in FIGS. 2A, 3A, 4A, and 5A, the bolt 214 can translate over a relatively linear path. When the bolt 214 is in the first position, the bolt 214 is positioned within a perimeter of the lock assembly 110, and the door 104 in which the lock assembly is located is unlocked. In the second position, the bolt 214 extends beyond a perimeter of the lock assembly 110 through an opening 226 in a side of the lock assembly 110, as shown in FIGS. 4A and 5A.

The bolt 214 can be sized, shaped, positioned, or otherwise configured to prevent access to the storage receptacle 100 when the bolt is in the second position. For example, the bolt 214 can be configured to engage with or otherwise interact with a securement feature within an interior section of the storage receptacle 100. The securement feature can be a passage, a hook, a curved end, or the like. The bolt 214 can be sized, shaped, positioned, or otherwise configured to permit the door 104 to be opened when the bolt 214 is in the first position. As described in further detail herein, translation of the bolt 214 can be controlled by the rotating body 208.

Figure 3A:
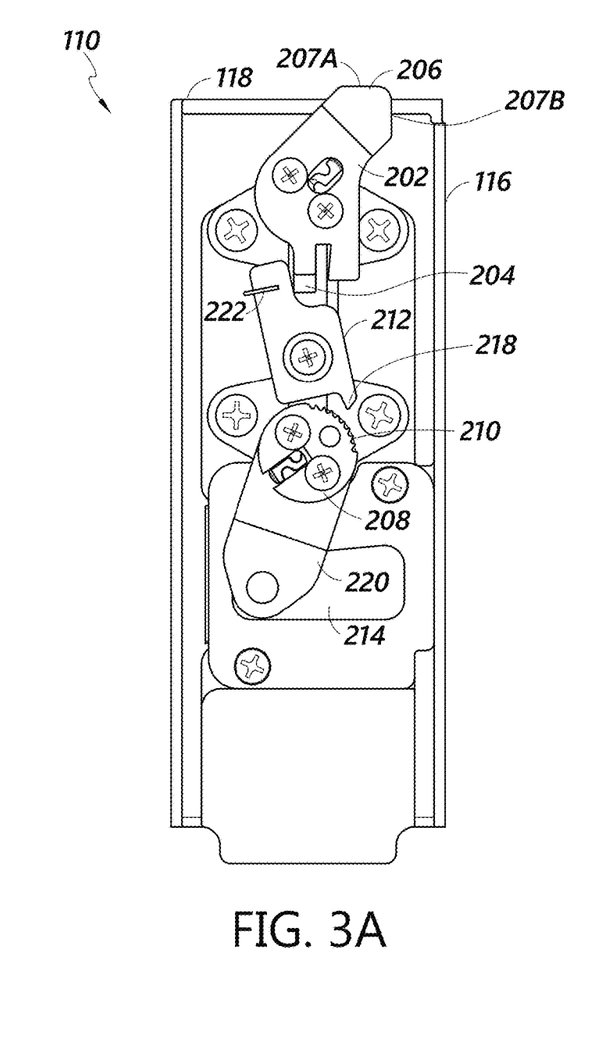
FIG. 3A is a rear view of the lock assembly of FIG. 2A depicting the lock assembly in a second configuration.

The rotating body 208 is configured to rotate between a first position and a second position in response to rotation of the key 410 within the lock 114. In FIGS. 2A and 3A, the rotating body 208 is shown in the first position. The rotating body 208 can be rotated from the first position to the second position, shown in FIGS. 4A and 5A, by rotation of the key 410 within the lock 114 in a first direction. The rotating body can be rotated from the second position to the first position by rotation of the key 410 within the lock 114 in a second direction. The second direction of rotation of the key 410 within the lock 114 can be opposite to the first direction of rotation of the key 410 within the lock 114.

The rotating body 208 can include or be coupled to a cam or arm 220. The arm 220 can be shaped, sized, positioned, or otherwise configured to couple to rotating body 208 with the bolt 214. The arm 220 can be coupled to the bolt 214 via one or more fasteners, such as screws, bolts, or the like. In some embodiments, the arm 220 can be permanently coupled to the bolt 214.

The rotating body 208 is coupled to the bolt 214 via the arm 220 such that rotation of the rotating body 208 from its first position to its second position can cause movement of the bolt 214 from its first position, shown in FIGS. 2A and 3A, to its second position, shown in FIGS. 4A and 5A. As described herein, when the bolt 214 is in its second position, the bolt 214 can prevent opening of the door 104 of the storage receptacle 100. The rotating body 208 can be rotated from its first position to its second position to cause movement of the bolt 214 from its second position to its first position. As described herein, when in its first position, the bolt 214 can permit opening of the door 104 of the storage receptacle 100. The lock 114, rotating body 208, and bolt 214 can operate together to function as the door lock of the lock assembly 110.

The pawl member 212 is rotatable between a first position, shown in FIGS. 2A and 5A, and a second position, shown in FIGS. 3A and 4A. The pawl member 212 includes an engagement member 216 and a pawl 218. As described in further detail herein, the pawl 218 can be sized, shaped, positioned, or otherwise configured to engage a portion of the rotating body 208 to prevent rotation of the rotating body 208 in certain situations.

The rotating body 208 includes a plurality of teeth 210. The plurality of teeth 210 are sized, shaped, positioned, or otherwise configured to engage the pawl 218 of the pawl member 212 such that rotation of the rotating body 208 is prevented in certain situations.

The rotating body 208 and pawl member 212 are sized, shaped, positioned, or otherwise configured such that the pawl 218 of the pawl member 212 engages the teeth 210 when the pawl member 212 is in its first position and the rotating body 208 is in its first position. When the pawl 218 engages the teeth 210 of the rotating body 208, the pawl 218 can prevent rotation of the rotating body 208 from its first position to its second position. When the pawl 218 is engaged with the teeth 210 of the rotating body, the pawl member 212 can be rotated from its first position to its second position to disengage the pawl 218 from the teeth 210. When the pawl 218 is disengaged from the teeth 210 and in its second position, the rotating body 208 can be rotated between its first position and its second position.

As described in further detail herein, the engagement member 216 of the pawl can be sized, shaped, positioned, or otherwise configured such that a portion of the rotating body 208 can engage the engagement member 216 to cause rotation of the pawl member 212 from its first position to its second position. A resilient member or spring 222 is coupled to the engagement member 216 to bias the pawl member 212 to its first position when no external force or minimal external force is applied to the engagement member 216 of the pawl member 212.

The body 202 is configured to rotate between a first position, shown in FIGS. 2A and 5A, and a second position, shown in FIGS. 3A and 4A. In certain embodiments, the body 202 can be configured to rotate between its first position and second position in response to rotation of the key 405 within the lock 112. The body 202 can be rotated from its first position to its second position by rotation of the key 405 within the lock 112 in a first direction. The body 202 can be rotated from its second position to its first position by rotating the key 405 in a second direction opposite the first direction within the lock 112.

The body 202 includes a protrusion 204. The protrusion 204 is sized, shaped, positioned, or otherwise configured to engage and disengage the engagement member 216 of the pawl member 212 when the body 202 is rotated between its first position and its second position. As shown in FIGS. 2A, 3A, 4A, and 5A, a portion of the engagement member 216 is positioned in the path of rotation of the protrusion 204. The body 202 can be rotated from its first position to its second position so that the protrusion 204 engages the engagement member 216 of the pawl member 212 and exerts a force on the pawl member 212 to cause the pawl member 212 to rotate from its first position to its second position. The body 202 can be rotated from its second position to its first position to disengage the protrusion 204 from the engagement member 216. After the protrusion 204 disengages the engagement member 216, the spring 222 can exert a biasing force on the engagement member 216 to cause the pawl member 212 to rotate from its second position to its first position. The lock 112, body 202, pawl member 212, and teeth can operate together to function as a restriction mechanism of the lock assembly 110.

In certain embodiments, the rotating body includes an arm 206. In certain embodiments, the cam 202 can also be rotated to a third position, as shown in FIG. 6A. In certain embodiments, the cam 202 can be rotated to the third position from the second position by further rotation of the key 405 within the lock 112 in the second direction. In the first and second positions of the cam 202, a portion of the arm 206 can extend beyond a perimeter of the lock assembly 110. When the portion of the arm 206 extends beyond the perimeter of the lock assembly 110, the arm 206 can engage a securement feature of the door 104 that prevents removal of the lock assembly 110 from the door 104. When the cam 202 is rotated to its third position, the arm 206 disengages from the securement feature of the door 104. When the rotating body is in its third position, the arm 206 is positioned to allow for removal of the locking assembly 110 from the door 104. The arm 206 can include a first surface 207A and a second surface 207B orthogonal to the first surface 207A.

Figure 7:
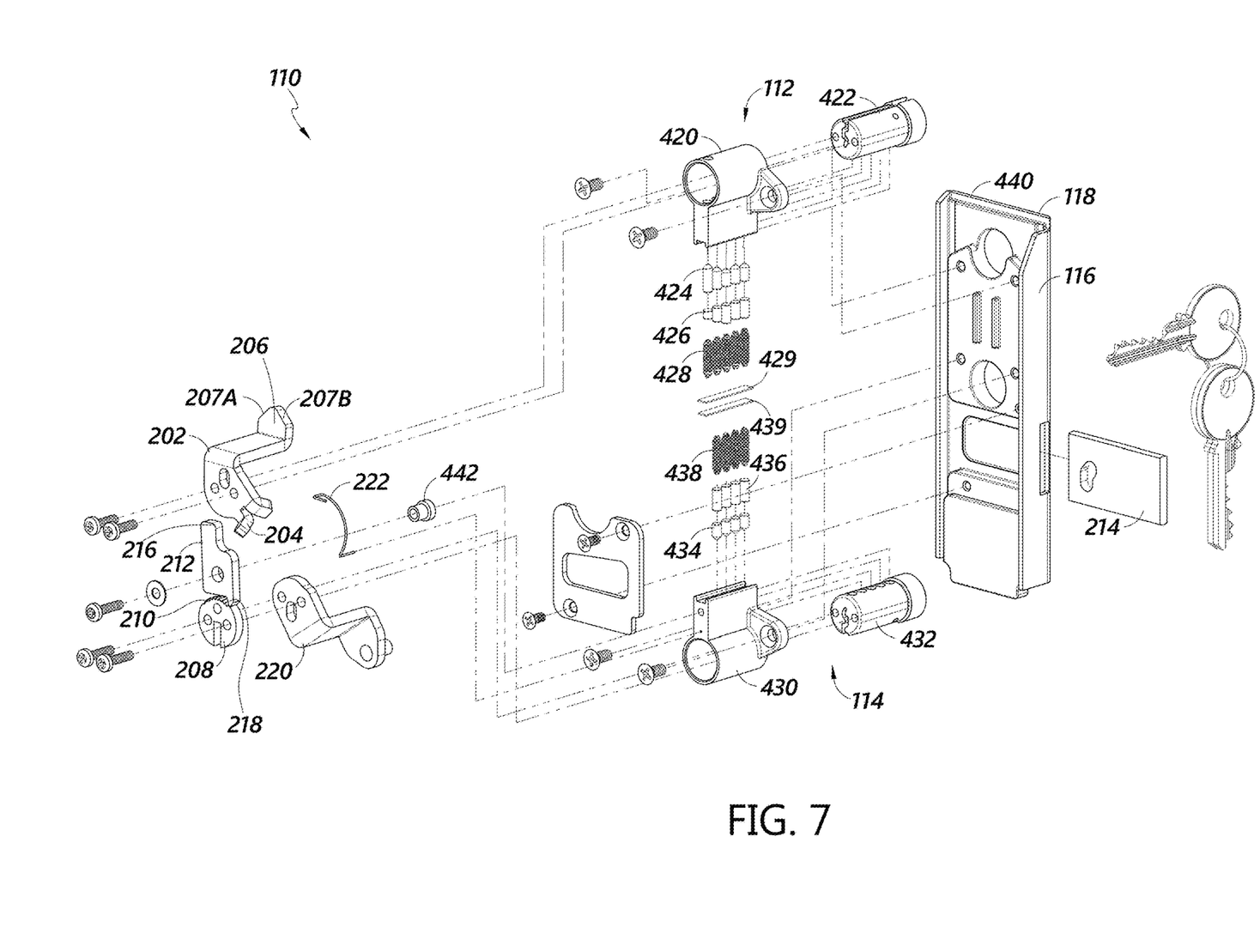
FIG. 7 is an exploded view of the lock assembly of FIG. 2A

FIG. 7 depicts an exploded view of the lock assembly 110. As shown in FIG. 7, the lock 112 includes a cylinder 420, a plug 422, tumblers 424, drivers 426, tumbler springs 428, and a retainer strip 429. The lock 114 includes a cylinder 430, a plug 432, tumblers 434, drivers 436, tumbler springs 438, and a retainer strip 439.

As shown in FIG. 7, the lock assembly 110 further includes a face plate 440 and a cover plate 441. The locks 112 and 114 and bolt 214 are configured to be received within the face plate 440.

As shown in FIG. 7, the lock assembly further includes a pivot 442. The pawl member 212 is configured to receive the pivot 442 and rotate about the pivot 442.

The above-described features of the locking assembly 110 can provide for selective restriction of the locking assembly 110 in which, after the locking mechanism 110 is unlocked to provide access to the lockable volume of the storage receptacle 100, locking of the storage receptacle 100 and removal of the key 410 from the lock 114 is prevented until the key 405 is used with the lock 112. An example process of using the lock assembly 110 is described with further reference to FIGS. 2A-5F.

Figure 2B:
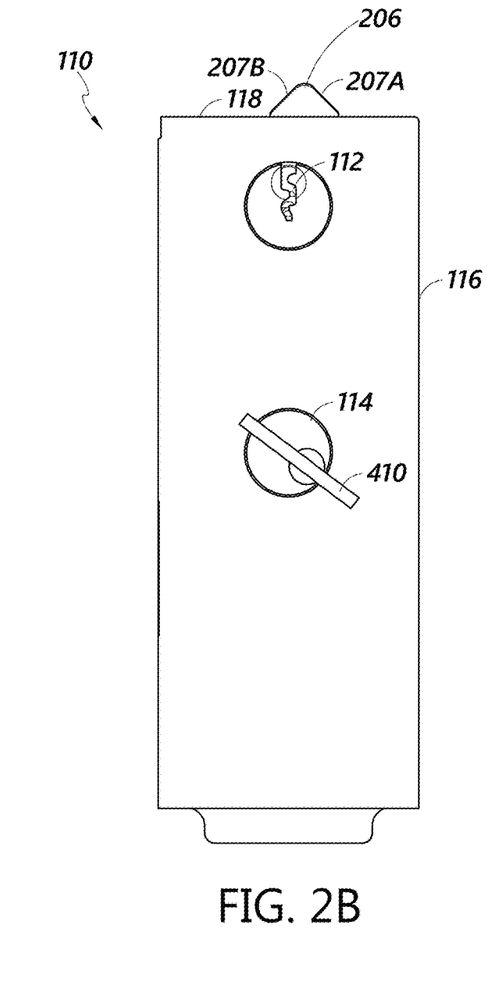
FIG. 2B is a front view of the lock assembly of FIG. 2A depicting a key in the second lock.

At the beginning of the example process described herein, the lock assembly 110 is in the configuration shown in FIGS. 2A and 2B, a key 410 is positioned within the lock 114, no key is positioned within the lock 112, and the lockable volume of the storage receptacle 100 is empty. This configuration may be indicative of a scenario in which a recipient has retrieved a distribution item from the storage receptacle 100 but a delivery person has not yet delivered a subsequent distribution item.

FIGS. 2A and 2B show an example of the lock assembly 110 in a first configuration in which a key is irremovably positioned within the lock 114 and the lock assembly 110 is open such that the door 104 can be opened to allow access to the lockable volume of the storage receptacle 100. As shown in FIGS. 2A and 2B, the pawl 218 engages the teeth 210 of the rotating body 208 to prevent rotation of the rotating body 208 from its first position to its second position. With the rotating body 208 in this position, the key cannot be withdrawn from the lock 114.

Figure 3B:
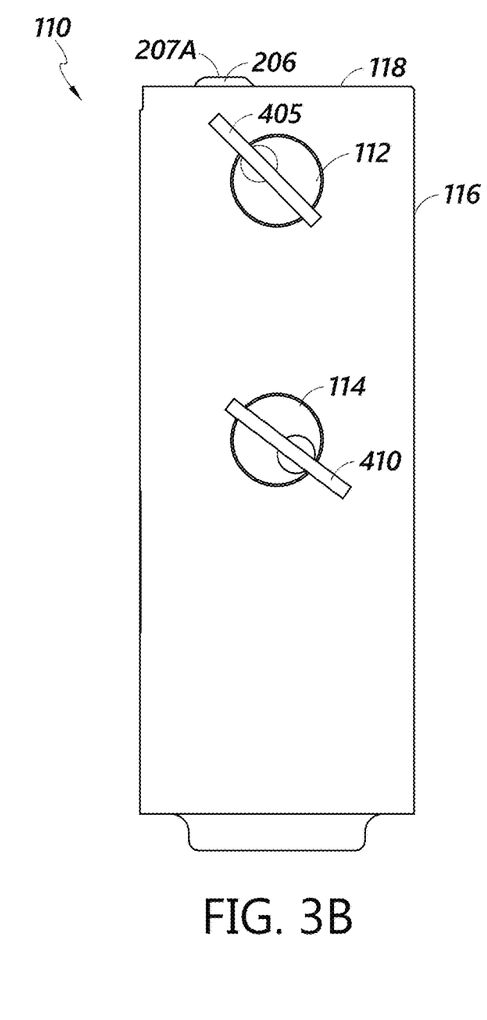
FIG. 3B is a front view of the lock assembly of FIG. 2A in the same configuration as FIG. 3A depicting a key in the second lock.

In a first step, a delivery person may deliver a distribution item to the storage receptacle 100. The key 405 can then be positioned within the lock 112 and turned as shown in FIG. 3B to rotate the body 202 from its first position, shown in FIG. 2A, to its second position, shown in FIG. 3A. When the body 202 is rotated from its first position to its second position, the protrusion 204 of the body 202 can engage the engagement member 216 of the pawl member 212 to cause rotation of the pawl member 212 from its first position, shown in FIG. 2A, to its second position, shown in FIG. 3A, such that the pawl 218 disengages the teeth 210. When the pawl 218 disengages the teeth 210, the rotating body 208 is no longer prevented from rotating from its first position to its second position by the pawl 218.

In a next step, when the pawl 218 is disengaged from the plurality of teeth 210, the key 410 within the lock 114 can be rotated as shown in FIG. 4B to cause rotation of the rotating body 208 from its first position, shown in FIG. 3A, to its second position, shown in FIG. 4A. Rotation of the rotating body 208 from its first position to its second position causes the bolt 214 to extend from the side of the lock assembly 110 to lock the storage receptacle 100, thereby locking the distribution item within the storage receptacle 100. When the rotating body 208 is in its second position, the key 410 positioned in the lock 114 can be removed from the lock. After the rotating body 208 is rotated from its first position to its second position, the key 410 can be removed from the lock 114 as shown in FIG. 4C.

After the rotating body 208 is rotated from its first position to its second position and the key 410 is removed from the lock 114, the key 405 in the lock 112 can be rotated to rotate the body 202 from its second position, shown in FIG. 4A, to its first position, shown in FIG. 5A. When the body 202 rotates from its second position to its first position, the protrusion 204 disengages the engagement member 216. When the protrusion 204 disengages the engagement member 216, the spring 222 causes the pawl member to rotate from its second position, shown in FIG. 4A, to its first position, shown in FIG. 5A. After the body 202 is rotated from its second position to its first position, the key 405 can be removed from the lock 112 as shown in FIGS. 5B and 5C.

FIG. 5A shows an example of the pawl member 212 in its first position and the rotating body 208 in its second position. As shown in FIG. 5A, the pawl 218 does not engage the teeth 210 of the rotating body 208 when the pawl member 212 is in its first position and the rotating body 208 is in its second position. As shown in FIG. 5A, the rotating body 208 is not prevented from rotation by the pawl member 212.

After the key 410 is removed from the lock 114 and the key 405 is removed from the lock 112, the key 410 corresponding to the lock 114 can be provided to an intended recipient of the distribution item positioned within the storage receptacle 100.

When the rotating body 208 is in its second position and the pawl member 212 is in its first position as shown in FIG. 5A, the key 410 can be inserted into the lock 114 as shown in FIGS. 5D-F. After the key 410 is inserted into the lock 114, the key 410 can be rotated to rotate the rotating body 208 from its second position, shown in FIG. 5A, to its first position, shown in FIG. 2A.

As described herein, rotation of the rotating body 208 from its second position to its first position causes the bolt 214 to retract into the lock assembly from its second position to its first position to unlock the storage receptacle 110. After the rotating body 208 is rotated from its second position to its first position, the pawl 218 of the pawl member 212 engages at least one of the plurality of teeth 210 of the rotating body 208, as shown in FIG. 2A, to prevent rotation of the rotating body 208 from the first position to the second position and to prevent removal of the key from the lock 114 and to prevent locking the door 104. The distribution item may then be retrieved from the storage receptacle 100. The example process may then begin over again.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

In the foregoing description, specific details are given to provide a thorough understanding of the examples. However, it will be understood by one of ordinary skill in the art that the examples may be practiced without these specific details.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A lock assembly comprising:
a housing having one or more first faces extending in a first direction, one or more second faces extending from the one or more first faces in a second direction orthogonal to the one or more first faces, and a longitudinal axis parallel with the one or more first faces, wherein the one or more first faces and the one or more second faces define a perimeter of the lock assembly;

a bolt movable along a linear path between a first position and a second position, wherein the bolt is positioned within the perimeter of the lock assembly in the first position of the bolt and extends beyond the perimeter of the lock assembly through one of the one or more first faces of the housing in the second position of the bolt;

a first rotating body rotatable about a first rotational axis between a first position and a second position and comprising a first arm extending radially from the first rotational axis, and pivotably attached to the bolt, wherein a longitudinal axis of the first arm intersects the first rotational axis and rotation of the first rotating body from the first position to the second position is configured to cause the bolt to move from the first position to the second position along the linear path;

a pawl member rotatable about a second rotational axis between a first position and a second position, the pawl member comprising:
  an engagement member extending in a first direction; and
  a pawl configured to engage the first rotating body, the pawl extending in a second direction opposite the first direction;

wherein:
  the pawl member is configured to prevent rotation of the first rotating body from the first position to the second position when the pawl member is in the first position; and
  a longitudinal axis of the pawl member is parallel to the first direction and the second direction; and a second rotating body rotatable about a third rotational axis between a first position, a second position, and a third position, the second rotating body comprising:
  a second arm comprising a first surface and a second surface orthogonal to the first surface; and
  a protrusion configured to contact the engagement member and cause the pawl member to rotate from the first position of the pawl member to the second position of the pawl member;

wherein:
  in the first position of the second rotating body, the protrusion does not contact the pawl member, and a first portion of the second arm extends beyond the perimeter of the lock assembly and engages a securement feature of a storage receptacle such that the first surface and the second surface are non-parallel to the one or more second faces of the housing;
  in the second position of the second rotating body, the second surface of the second arm is parallel with the longitudinal axis of the housing, the protrusion directly contacts the pawl member, and a second portion of the second arm extends beyond the perimeter of the lock assembly and engages a securement feature of the storage receptacle such that the first surface is parallel with the one or more second faces of the housing; and
  in the third position of the second rotating body, the protrusion does not contact the pawl member, and the second arm disengages from the securement feature and does not extend beyond the perimeter of the lock assembly; and
  wherein the first rotational axis, the second rotational axis, and the third rotational axis are longitudinally displaced and linearly aligned along a longitudinal axis of the lock assembly.

2. The lock assembly of claim 1, wherein the pawl member is configured to permit rotation of the first rotating body from the first position to the second position when the pawl member is in the second position.

3. The lock assembly of claim 1, wherein the first rotating body comprises a plurality of teeth, wherein the pawl member comprises a pawl configured to engage the plurality of teeth when the pawl member is in the first position and the first rotating body is in the first position to form a ratcheting mechanism.

4. The lock assembly of claim 1, further comprising a spring configured to bias the pawl member to the first position.

5. The lock assembly of claim 1, further comprising:
  a first lock configured to accept a first key, the first lock coupled to the first rotating body; and
  a second lock configured to accept a second key, the second lock coupled to the pawl member.

6. The lock assembly of claim 5, wherein the first rotating body is configured to rotate in response to turning the first key within the first lock, and wherein the pawl member is configured to rotate in response to turning the second key in the second lock.

7. The lock assembly of claim 1, wherein the lock assembly is configured to be removably received within a door of the storage receptacle, wherein the securement feature is configured to prevent removal of the lock assembly from the door when the second arm is engaged with the securement feature.

8. The lock assembly of claim 1, wherein the second rotating body is configured to be rotated in a first direction from the second rotating body's first position to the second rotating body's second position, wherein the second rotating body is configured to be rotated in a second direction from the second rotating body's second position to the second rotating body's third position, wherein the first direction is different from the second direction.

9. A method for operating a lock assembly, comprising:
  rotating a pawl member comprising an engagement member extending in a first direction and a pawl extending in a second direction opposite the first direction about a second rotational axis from a first position to a second position, wherein the pawl member is configured to prevent rotation of a first rotating body from a first position to a second position when the pawl member is in the first position;
  rotating the first rotating body about a first rotational axis between the first position and the second position, wherein the first rotating body comprises a first arm extending radially from the first rotational axis and pivotably mounted to a bolt, wherein rotation of the first rotating body from the first position to the second position is configured to cause the bolt to move along a linear path from a first position to a second position; and
  rotating a second rotating body about a third rotational axis in a first direction from a first position to a second position, the second rotating body, having a second arm comprising a first surface and a second surface orthogonal to the first surface, and a protrusion, wherein a first portion of the second arm extends beyond a perimeter of the lock assembly and engages a securement feature of a storage receptacle in the first position such that the first surface and the second surface are non-parallel to a longitudinal axis of the lock assembly and a second portion of the second arm extends beyond the perimeter of the lock assembly and engages a securement feature in the second position such that the second surface is parallel with the longitudinal axis of the lock assembly;

directly contacting the protrusion of the second rotating body with the engagement member of the pawl member as the second rotating body is rotated from the first position to the second position, thereby causing the pawl member to rotate in a second direction from the first position of the pawl member to the second position of the pawl member;

rotating the second rotating body in a second direction from the second position to a third position thereby causing the second arm to disengage from the securement feature, and when the second rotating body is in the third position the second arm does not extend beyond the perimeter of the lock assembly and the protrusion does not contact the pawl member;

wherein the first direction is different from the second direction;

wherein the bolt is positioned within a perimeter of the lock assembly in the first position of the bolt and extends beyond the perimeter of the lock assembly in the second position of the bolt;

wherein the first rotational axis, the second rotational axis, and the third rotational axis are longitudinally displaced and linearly aligned along the longitudinal axis of the lock assembly.

10. The method of claim 9, wherein the pawl member is configured to permit rotation of the first rotating body from the first position to the second position when the pawl member is in the second position.

11. The method of claim 9, wherein the first rotating body comprises a plurality of teeth, wherein the pawl member comprises a pawl configured to engage the plurality of teeth when the pawl member is in the first position and the first rotating body is in the first position to form a ratcheting mechanism.

12. The method of claim 9, wherein the lock assembly comprises a spring configured to bias the pawl member to the first position.

13. The method of claim 9, further comprising:
receiving a first key in a first lock, the first lock coupled to the first rotating body; and
receiving a second key in a second lock, the second lock coupled to the pawl member.

14. The method of claim 13, further comprising:
turning the first key within the first lock to cause rotation of the first rotating body; and
turning the second key within the second lock to cause rotation of the pawl member.

15. The method of claim 9, wherein the lock assembly is configured to be removably received within a door of the storage receptacle, wherein the securement feature is configured to prevent removal of the lock assembly from the door when the second arm is engaged with the securement feature.

16. A lock assembly comprising:
a bolt movable along a linear path between a first position and a second position, wherein the bolt is positioned within a perimeter of the lock assembly in the first position of the bolt and extends beyond the perimeter of the lock assembly in the second position of the bolt;

a first rotating body rotatable about a first rotational axis between a first position and a second position and comprising a first arm pivotably attached to the bolt, wherein rotation of the first rotating body from the first position to the second position is configured to cause the bolt to move from the first position to the second position along the linear path;

a pawl member rotatable about a second rotational axis between a first position and a second position, the pawl member comprising:
an engagement member extending in a first direction; and
a pawl configured to engage the first rotating body, the pawl extending in a second direction opposite the first direction;

wherein:
the pawl member is configured to prevent rotation of the first rotating body from the first position to the second position when the pawl member is in the first position and the first rotating body is in the first position;
a longitudinal axis of the pawl member is parallel to the first direction and the second direction; and a second rotating body rotatable about a third rotational axis between a first position, a second position, and a third position, the second rotating body comprising:
a second arm comprising a first surface and a second surface orthogonal to the first surface; and
a protrusion configured to directly contact the pawl member when the second rotating body is rotated between the first position to the second position to cause the pawl member to rotate from the first position of the pawl member to the second position of the pawl member;

wherein:
the first surface and the second surface are arranged at an angle to a longitudinal axis of the second arm;
the longitudinal axis of the second arm is parallel with a longitudinal axis of the lock assembly in the first position such that a first portion of the second arm is configured to extend beyond a perimeter of the lock assembly and engage a securement feature of a storage receptacle when the second rotating body is in the first position;
the second surface of the second arm is parallel with the longitudinal axis of the lock assembly in the second position such that a second portion of the second arm is configured to extend beyond a perimeter of the lock assembly and engage a securement feature of the storage receptacle when the second rotating body is in the second position, and
the second arm is configured to disengage from the securement feature when the second rotating body is in the third position; and wherein the first rotational axis, the second rotational axis, and the third rotational axis are longitudinally displaced and linearly aligned along the longitudinal axis of the lock assembly.

* * * * *